(12) United States Patent
Lundsgaard et al.

(10) Patent No.: US 7,742,442 B2
(45) Date of Patent: Jun. 22, 2010

(54) CHANGING ACCESS POINT (AP) DEVICE TYPE BASED ON CONNECTIVITY TO A NETWORK

(75) Inventors: Soren K. Lundsgaard, Inverness, IL (US); Michael F. Korus, Eden Prairie, MN (US); Wei Mao, Palatine, IL (US); Surong Zeng, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 404 days.

(21) Appl. No.: 11/622,230

(22) Filed: Jan. 11, 2007

(65) Prior Publication Data
US 2008/0170527 A1 Jul. 17, 2008

(51) Int. Cl.
*H04H 20/71* (2008.01)
(52) U.S. Cl. ............ 370/312; 370/432; 370/346; 370/351; 455/41.2
(58) Field of Classification Search ......... 370/217–238, 370/242–251, 312, 346, 432, 351; 455/41.2
See application file for complete search history.

(56) References Cited

U.S. PATENT DOCUMENTS

| | | | |
|---|---|---|---|
| 5,570,366 A * | 10/1996 | Baker et al. ............... 370/312 |
| 5,729,680 A | 3/1998 | Belanger et al. | |
| 2002/0075844 A1* | 6/2002 | Hagen ................... 370/351 |
| 2003/0016624 A1 | 1/2003 | Bare | |
| 2003/0227934 A1* | 12/2003 | White et al. ............ 370/432 |
| 2005/0192037 A1 | 9/2005 | Nanda et al. | |
| 2006/0268793 A1* | 11/2006 | Zanaty .................. 370/338 |
| 2008/0137556 A1* | 6/2008 | Park et al. .............. 370/255 |

OTHER PUBLICATIONS

PCT/US07/80068—International Search Report with Written Opinion mailed Apr. 11, 2008-9 pages.

* cited by examiner

*Primary Examiner*—Kent Chang
*Assistant Examiner*—Kashif Siddiqui
(74) *Attorney, Agent, or Firm*—Randi L. Karpini

(57) ABSTRACT

Techniques are provided for determining whether a particular Access Point (AP) is to be designated as an Infrastructure Access Point (IAP) or a Backhaul Mesh Access Point (BMAP) based on the connectivity of the particular AP to a network which includes at least one multicast heartbeat message (MCHBM) source. Techniques are provided which can allow an Infrastructure Access Point (IAP) to change its device type to a Backhaul Mesh Access Point (BMAP) device type when the IAP determines that connectivity to the network is lost. Other techniques are provided which can allow a Backhaul Mesh Access Point (BMAP) to change its device type to an Infrastructure Access Point (IAP) device type when the BMAP determines that connectivity to the network is established.

15 Claims, 7 Drawing Sheets

CHANGING ACCESS POINT (AP) DEVICE TYPE BASED ON CONNECTIVITY TO A NETWORK

FIELD OF THE INVENTION

The present invention relates generally to wireless communications and more particularly to techniques for determining whether a particular Access Point (AP) is to be designated as an Infrastructure Access Point (IAP) or a Backhaul Mesh Access Point (BMAP).

BACKGROUND

Types of wireless networks include infrastructure-based wireless networks and ad hoc wireless networks.

Ad hoc networks are self-forming networks which can operate in the absence of any fixed infrastructure, and in some cases the ad hoc network is formed entirely of mobile nodes. An ad hoc network typically includes a number of geographically-distributed, potentially mobile units, sometimes referred to as "nodes," which are wirelessly connected to each other by one or more links (e.g., radio frequency communication channels). The nodes can communicate with each other over a wireless media without the support of an infrastructure-based or wired network. Links or connections between these nodes can change dynamically in an arbitrary manner as existing nodes move within the ad hoc network, as new nodes join or enter the ad hoc network, or as existing nodes leave or exit the ad hoc network. Because the topology of an ad hoc network can change significantly techniques are needed which can allow the ad hoc network to dynamically adjust to these changes. Due to the lack of a central controller, many network-controlling functions can be distributed among the nodes such that the nodes can self-organize and reconfigure in response to topology changes.

One characteristic of the nodes is that each node can directly communicate over a short range with nodes which are a single "hop" away. Such nodes are sometimes referred to as "neighbor nodes." When a node transmits packets to a destination node and the nodes are separated by more than one hop (e.g., the distance between two nodes exceeds the radio transmission range of the nodes, or a physical barrier is present between the nodes), the packets can be relayed via intermediate nodes ("multi-hopping") until the packets reach the destination node. In such situations, each intermediate node routes the packets (e.g., data and control information) to the next node along the route, until the packets reach their final destination. For relaying packets to the next node, each node should maintain routing information collected through conversation with neighboring nodes. The routing information can also be periodically broadcast in the network to reflect the current network topology. Alternatively, to reduce the amount of information transmitted for maintaining accurate routing information, the network nodes may exchange routing information only when it is needed. One approach for routing information, known as Mesh Scalable Routing (MSR), is described in U.S. Patent Application 20040143842 entitled "System and method for achieving continuous connectivity to an access point or gateway in a wireless network following an on-demand routing protocol, and to perform smooth handoff of mobile terminals between fixed terminals in the network", filed on Jan. 13, 2004, which is incorporated by reference herein in its entirety. The Mesh Scalable Routing (MSR) defines two types of Access Points (APs): a Mesh Access Point (MAP) and an Infrastructure Access Point (IAP). MAPs can have an infrastructure state and an ad-hoc state, whereas IAPs are statically defined.

BRIEF DESCRIPTION OF THE FIGURES

The accompanying figures, which together with the detailed description below are incorporated in and form part of the specification, serve to further illustrate various embodiments and to explain various principles and advantages all in accordance with the present invention.

Figure 1:
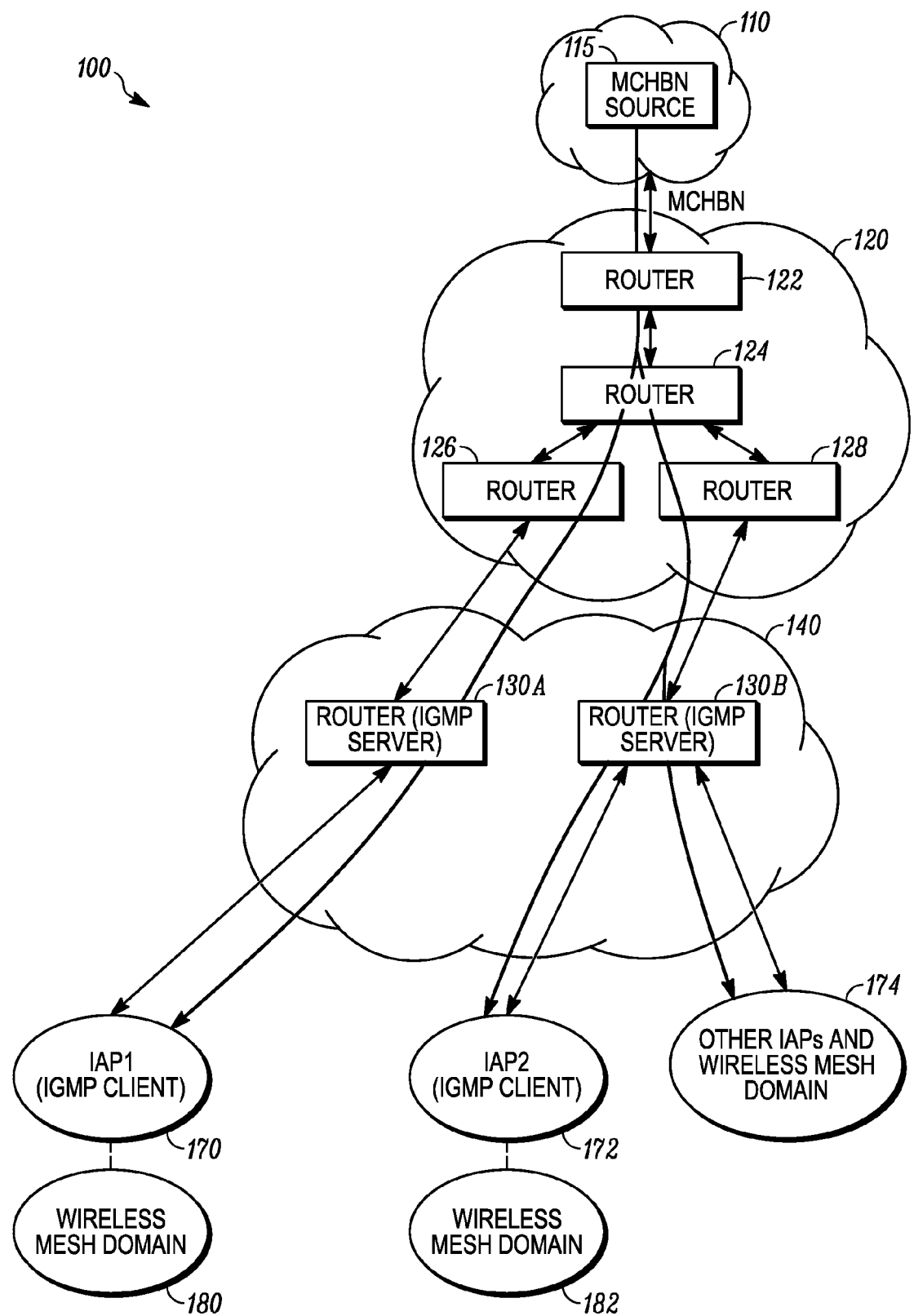
FIG. 1 is a block diagram of an exemplary communication network in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to determining whether a particular Access Point (AP) is to be designated as an Infrastructure Access Point (IAP) or a Backhaul Mesh Access Point (BMAP) based on the connectivity of the particular AP to a network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions for determining whether a particular Access Point (AP) is to be designated as an Infrastructure Access Point (IAP) or a Backhaul Mesh Access Point (BMAP) based on the connectivity of the particular AP to a network as described herein. The non-processor circuits may include, but are not limited to, a radio receiver, a radio transmitter, signal drivers, clock circuits, power source circuits, and user input devices. As such, these functions may be interpreted as steps of a method for determining whether a particular Access Point (AP) is to be designated as an Infrastructure Access Point (IAP) or a Backhaul Mesh Access Point (BMAP) based on the connectivity of the particular AP to a network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily designed to allow generating such software instructions and programs and ICs with minimal experimentation.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Overview

In a mesh network, a node's determination of whether it is an IAP or not (and therefore its operational behavior) is determined by the pre-configuration on the AP. However, if connectivity between the IAP and the customer's network fails (e.g., cut wire, router goes down, etc.), then there will be a loss of service to any nodes which are bound to the failed IAP. Moreover, there will be no layer 2 (L2) notification or state change due to the failure of this IAP.

Embodiments of the present invention provide techniques for determining whether a particular Access Point (AP) is to be designated as an Infrastructure Access Point (IAP) or a Backhaul Mesh Access Point (BMAP) based on the connectivity of the particular AP to a network, such as a Customer Enterprise Network (CEN), that includes at least one multicast heartbeat message (MCHBM) source. Although the embodiments described herein refer to determining the connectivity (or loss of connectivity) of a particular Access Point (AP) to a Customer Enterprise Network (CEN) based on a multicast heartbeat message (MCHBM) received from at least one multicast heartbeat message (MCHBM) source that is strategically placed or provided in the CEN, it will be appreciated that the same techniques can be applied in determining the connectivity (or loss of connectivity) of a particular Access Point (AP) to any network, wired backhaul, or wireless backhaul (e.g., a microwave backhaul), based on a multicast heartbeat message (MCHBM) received from at least one multicast heartbeat message (MCHBM) source that is strategically placed or provided in the network, wired backhaul, or wireless backhaul. Connectivity of the particular AP to the MCHBM source in the network requires at least one path along links and/or nodes between the particular AP and the MCHBM source. Loss of connectivity of the particular AP to the MCHBM source in the network generally occurs when at least some of the links and/or nodes between the particular AP and the MCHBM source fail (e.g., there could be a break in the link at the edge network, the WAN network, or even within the CEN, such as, a failure in the firewall of the CEN).

For example, in one embodiment, techniques are provided which can allow an Infrastructure Access Point (IAP) to change its device type to a Backhaul Mesh Access Point (BMAP) device type when the IAP determines that connectivity to a Customer Enterprise Network (CEN) is lost. An all-IAP multicast group is defined which comprises a plurality of member IAPs. The at least one multicast heartbeat message (MCHBM) source can multicast a multicast heartbeat message to the member IAPs of the all-IAP multicast group on a regular basis. Each of the member IAPs can then determine whether it is connected to the Customer Enterprise Network (CEN) based on whether it has received the multicast heartbeat messages.

In another embodiment, techniques are provided which can allow a Backhaul Mesh Access Point (BMAP) to change its device type to an Infrastructure Access Point (IAP) device type when the BMAP determines that connectivity to the Customer Enterprise Network (CEN) is established. The BMAP monitors a port associated with the Customer Enterprise Network (CEN) for multicast heartbeat messages originating from a MCHBM source, and determines whether the BMAP has received a number of multicast heartbeat messages from the MCHBM source within a time interval. The BMAP can determine that it has established connectivity to the Customer Enterprise Network (CEN) when a number of multicast heartbeat messages have been received within a time interval.

FIG. 1 is a block diagram of an exemplary communication network 100 in accordance with some embodiments of the invention. The network 100 comprises a customer enterprise network (CEN) 110, a multicast enabled wide area network (MEWAN) 120 and a multicast enabled edge network (MEEN) 140.

The customer enterprise network (CEN) comprises MCHBM source 115 of multicast heartbeat messages (MCHBMs). Although FIG. 1 shows only one MCHBM source 115 it will be appreciated that the CEN can implement multiple or "redundant" sources (e.g., two or more sources) to avoid a single point failure.

As used herein, the term "wide area network (WAN)" refers to a computer network covering a broad geographical area. A well-known example of a WAN is the Internet. WANs are used to connect local area networks (LANs) together, so that users and computers in one location can communicate with users and computers in other locations. In this specific example, the MEWAN comprises a network 120 which includes a plurality of routers 122-128 and in one implementation the routers 122-128 can be implemented in the Internet. Each of the routers 122-128 is designed to support a multicast routing algorithm which allows the routers 122-128 to form a multicast tree to deliver multicast heartbeat messages to each IAP in the network.

The MEEN 140 comprises routers 130 A,B. Each of the routers 130 A, B include an Internet Group Management Protocol (IGMP) server (not shown), and support IGMP server functionality which allows the routers 130 A, B to periodically send an IGMP general query to the LAN segments attached to them. For example, each of the routers 130 A, B can have an IGMP server (not shown) which runs an IGMP server protocol to detect the multicast members attached to it (e.g., through a LAN or a point-to-point link). The IGMP is a communications protocol used to manage the membership of Internet Protocol (IP) multicast groups. IGMP is used by IP hosts and adjacent multicast routers to establish multicast group memberships. In one exemplary implementation, the IGMP query interval can be 15 seconds.

A member IAP 170 defines a wireless mesh domain 180, another member IAP 172 defines another wireless mesh domain 182, and a plurality of other member IAPs 174 each define their own corresponding wireless mesh domains (not shown).

The CEN 110 assigns a multicast IP address for the all-IAP multicast group (e.g., 224.0.2.0), and forms a multicast group for all IAPs in the network with an unused multicast address within a range (e.g., a range of 224.0.2.0 to 238.255.255.255).

The MCHBM source 115 transmits a multicast heartbeat message (MCHBM) on a regular basis to member IAPs 170, 172, 174 of the all-IAP multicast group. For example, the MCHBM source 115 can run a specialized multicast application that generates the MCHBM on a regular basis, and then sends the MCHBM to all member IAPs 170, 172, 174 of the all-IAP multicast group. The multicast heartbeat message (MCHBM) is represented in FIG. 1 by the arrows going from the MCHBM source 115 to the various member IAPs 170, 172, 174. In one implementation, the MCHBM can be sent periodically at a fixed "heartbeat interval" from each source (e.g., when multiple sources are implemented) in the CEN. In one exemplary implementation, the heartbeat interval can be 15 seconds. When redundant sources are implemented, each source can start an interval timer for sending their MCHBMs.

The various member IAPs 170, 172, 174 each have IGMP client functionality so that the various member IAPs 170, 172, 174 can subscribe to or join an "all-IAP multicast group." For example, the member IAPs 170, 172, 174 each run IGMP client protocol to send a IGMP membership report to their respective first-hop multicast routers to join the all IAP multicast group and respond a subsequent periodic IGMP query from their respective first-hop multicast routers.

Each of the member IAPs 170, 172, 174 of the all IAP multicast group can use the MCHBM to determine whether that particular member IAP is to be designated as an Infrastructure Access Point (IAP) or a Backhaul Mesh Access Point (BMAP) based on the connectivity of the particular member IAP to the MCHBM source 115 of the CEN 110. For example, each of the member IAPs 170, 172, 174 can include a multicast processing engine or application which allows them to receive a multi-cast heartbeat message (MCHBM) transmitted from the MCHBM source 115, and process the MCHBM to detect their respective connection status to the MCHBM source 115 of the CEN 110 as will be described below with reference to FIGS. 3-4 and 6-7.

Figure 2:
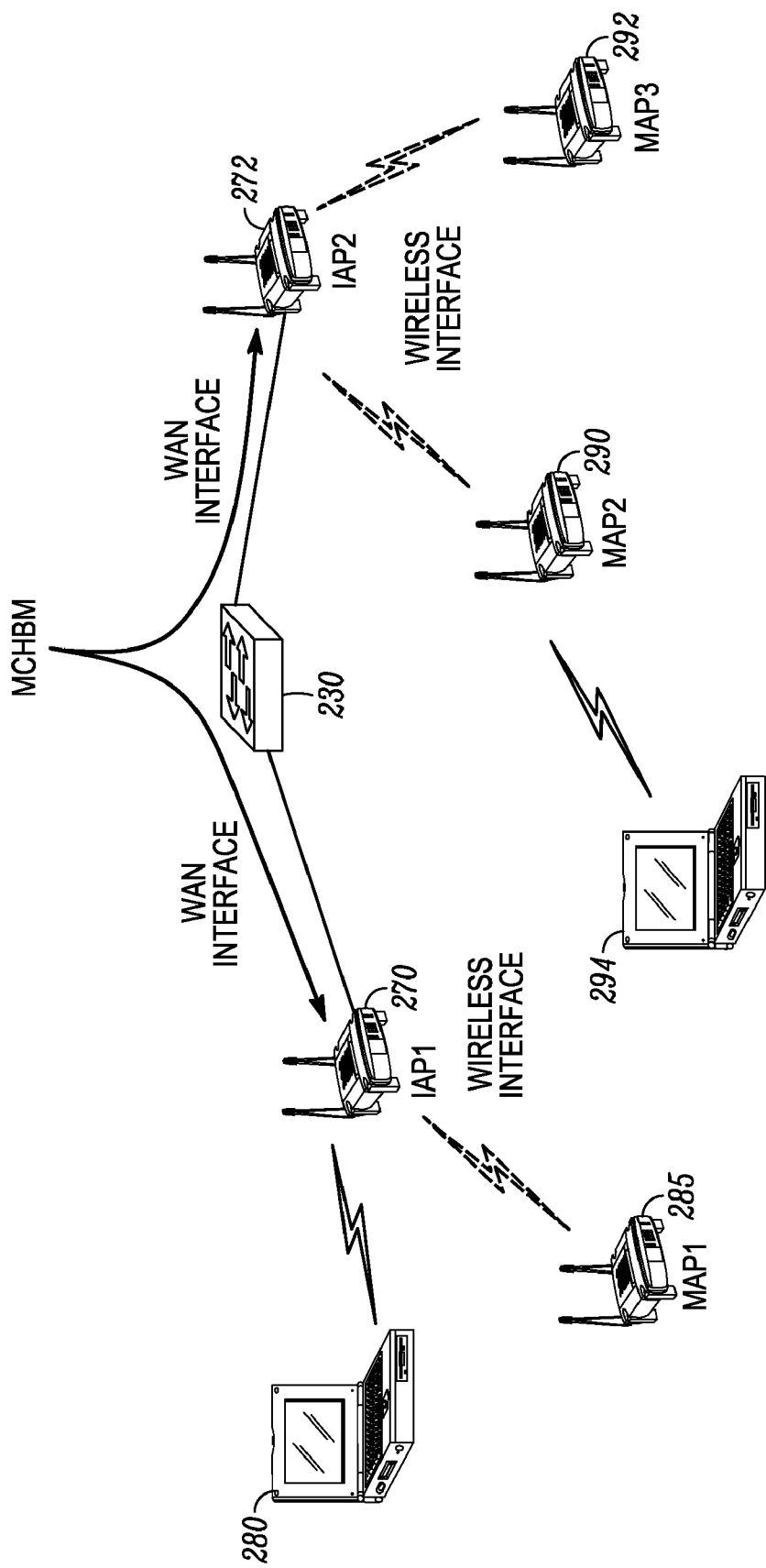
FIG. 2 is a block diagram showing an exemplary network which includes an Infrastructure Access Point (IAP) operating in accordance with some embodiments of the invention.

FIG. 2 is a block diagram showing an exemplary network 200 which includes an Infrastructure Access Point (IAP 1) 270 operating in accordance with some embodiments of the invention. The network 200 comprises a router 230, an infrastructure access point (IAP1) 270 operating in IAP mode, and an infrastructure access point (IAP2) 272 operating in IAP mode. A host 280 and a mesh access point (MAP1) 285 are coupled to the infrastructure access point (IAP1) 270. Mesh access points (MAPs) 290, 292 are coupled to the infrastructure access point (IAP2) 272, and a host 294 is coupled to the MAP 290. When the IAP1 270 and IAP2 272 receive a MCHBM, they do not forward the MCHBM onto their wireless interfaces. Both IAP1 270 and IAP2 272 specifically filter the received MCHBM messages after they consume them to prevent them from being forwarded on their respective wireless interfaces.

Switching from IAP Mode to BMAP Mode

Figure 3:
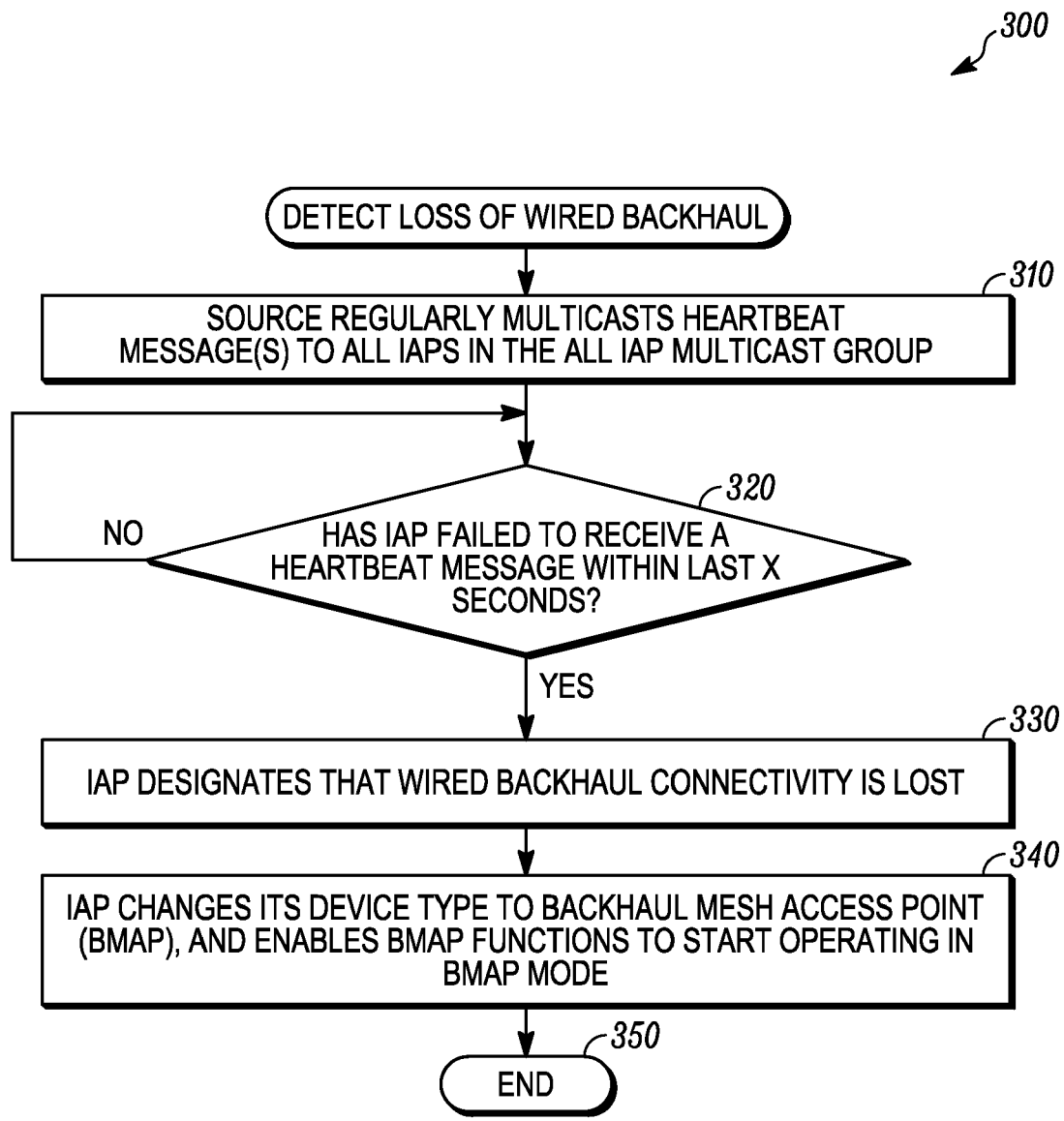
FIG. 3 is a flowchart showing an exemplary method for changing a device type of an Infrastructure Access Point (IAP) to a Backhaul Mesh Access Point (BMAP) device type when the IAP determines that connectivity to a Customer Enterprise Network (CEN) is lost in accordance with some embodiments of the invention.

FIG. 3 is a flowchart showing an exemplary method 300 for changing a device type of an Infrastructure Access Point (IAP) to a Backhaul Mesh Access Point (BMAP) device type when the IAP determines that connectivity to a MCHBM source 115 (and hence the CEN 110) is lost in accordance with some embodiments of the invention. Method 300 is used once the MCHBM source assigns a multicast IP address for the all-IAP multicast group, and the various member IAPs 270, 272 have subscribed to an "all-IAP multicast group."

When the method 300 begins at step 310, the MCHBM source transmits a multicast heartbeat message (MCHBM) on a regular basis to member IAPs 270, 272 of the all-IAP multicast group. For example, the MCHBM source can run a specialized multicast application that generates the MCHBM on a regular basis, and then multicasts the MCHBM to all member IAPs 270, 272 of the all-IAP multicast group. In one implementation, the MCHBM can be sent periodically at a fixed "heartbeat interval" from each source in the CEN. Each member IAPs 270, 272 of the all-IAP multicast group can use the MCHBM to determine its connectivity to the MCHBM source 115 of the CEN 110, and whether that particular member IAP is to be designated as an Infrastructure Access Point (IAP) or a Backhaul Mesh Access Point (BMAP). It will be appreciated that while this exemplary implementation refers to a single source, in other implementations, there can be multiple sources in a CEN generating their own MCHBMs.

At step 320, each of the member IAPs 270, 272 of the all IAP multicast group can determine whether the particular member IAP has failed to receive a MCHBM (or a certain number of MCHBMs) within the last X seconds, where X is a time period or duration that is set depending on the specific implementation. For example, each of the member IAPs 270, 272 can include a multicast processing engine or application which allows them to receive a MCHBM transmitted from the source (or sources) 115, and process the MCHBM. There are numerous techniques which could be used to determine whether the particular member IAP has failed to receive the MCHBM within a certain time period. For example, the member IAPs 270, 272 of the all IAP multicast group can listen for a MCHBM to confirm that they are connected to the MCHBM source 115 of the CEN 110 (e.g., to confirm that the CEN is "alive"), and when a member IAP of the all IAP multicast group misses the MCHBMs from the MCHBM source for a certain duration (e.g., 60 seconds), that member IAP assumes that connectivity to the CEN 110 has been lost. One exemplary implementation of step 320 will be described below with reference to FIG. 4.

If the particular member IAP determines that it has received the MCHBM within the time period, then the method 300 loops back to step 320 after a delay.

By contrast, if the particular member IAP determines that it has failed to receive the MCHBM within the time period, then at step 330, the particular member IAP determines that its connection to the CEN 110 has been lost, and at step 340, the particular member IAP changes its device type to a BMAP and enables BMAP functionality to start operating in BMAP mode.

Figure 4:
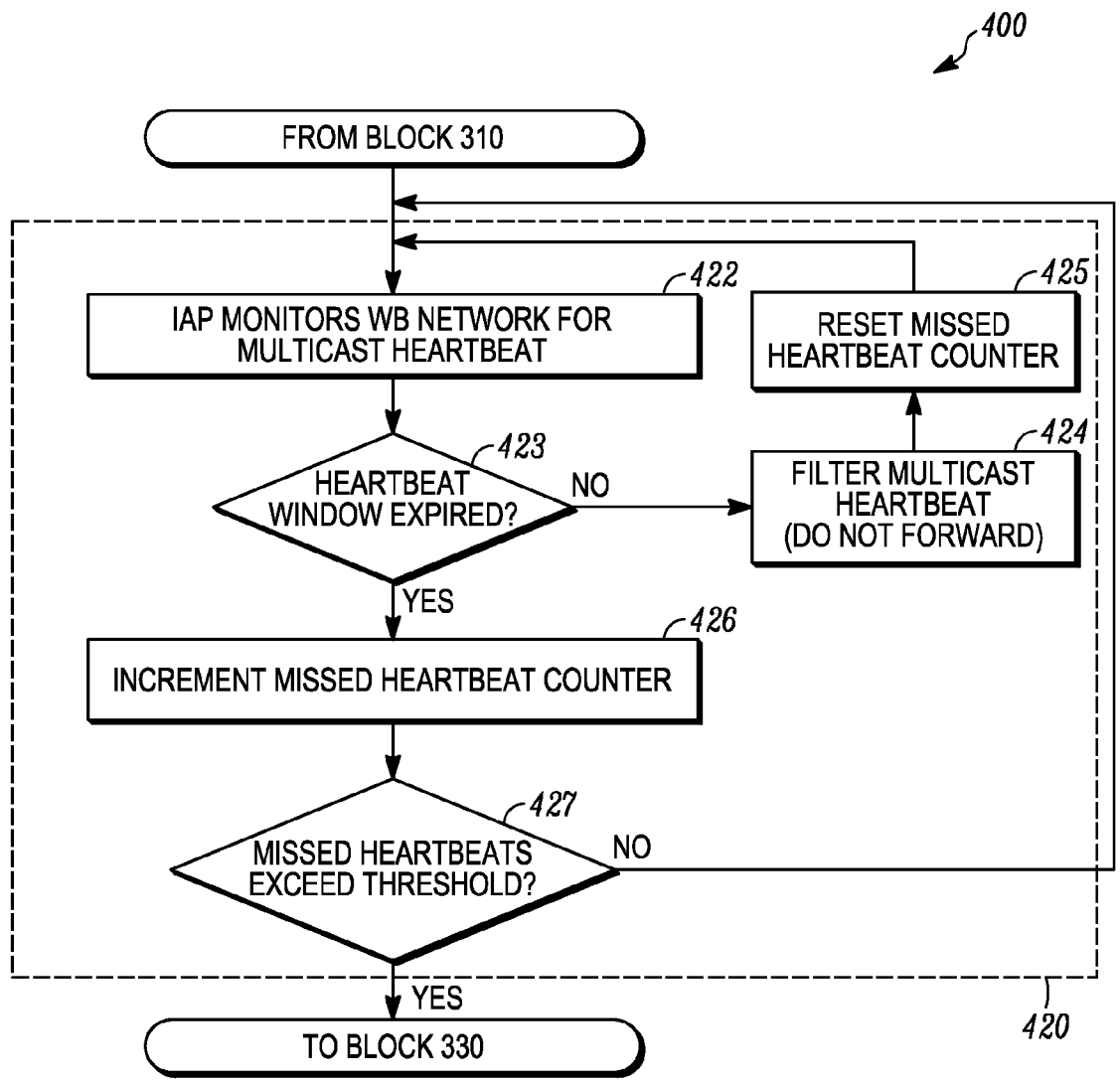
FIG. 4 is a flowchart showing an exemplary method for determining whether an Infrastructure Access Point (IAP) has received a number of heartbeat messages from a source within a time period in accordance with some embodiments of the invention.

FIG. 4 is a flowchart showing an exemplary method 420 for determining whether an Infrastructure Access Point (IAP) has received a number of heartbeat messages from a source within a time period in accordance with some embodiments of the invention.

Method 400 starts at step 422 where the particular member IAP monitors the CEN 110 network for a MCHBM from the MCHBM source 115 in the CEN 110. At step 423, the particular member IAP determines whether a "heartbeat" window has expired. For example, in one implementation, the heartbeat window can be set for a particular duration (e.g., 60 seconds), and a time-based counter (e.g., a counter which uses internal clocking source) continuously runs, and records the amount of time passed since the last reception of a MCHBM.

If the particular member IAP determines that the "heartbeat" window has not expired (e.g., the member IAP has received a MCHBM from the MCHBM source 115 within the window period), then the method 420 proceeds to step 424 where the particular member IAP filters the MCHBM, and at step 425 resets its missed heartbeat counter. Without step 424, the particular member IAP would propagate the multicast packet on each of its interfaces with membership. Neighboring wireless mesh devices listening to the multicast group will falsely perceive that they were directly connected to the WAN since they are receiving the MCHBM. This can result in the device converting to an IAP. This becomes particularly important for a BMAP that is looking for MCHBMs to determine when to convert back to an IAP. Without this filtering step 424, the network would cause the BMAP to determine that it has WAN connectivity. The method 400 then loops back to step 422.

If the particular member IAP determines that the "heartbeat" window has expired (e.g., the member IAP has not received a MCHBM from the MCHBM source 115 within the window period), then the method 420 proceeds to step 426 where the particular member IAP increments its missed heartbeat counter.

The method 420 proceeds to step 427 where the particular member IAP determine whether the number of missed MCHBMs exceeds a threshold number of MCHBMs (e.g., four MCHBMs). If the number of missed MCHBMs is less than or equal to the threshold number of MCHBMs, then the method 420 loops back to step 422 and the method 420 repeats. If the number of missed MCHBMs is greater than the threshold number of MCHBMs, then the method 420 proceeds to step 330 in FIG. 3.

Figure 5:
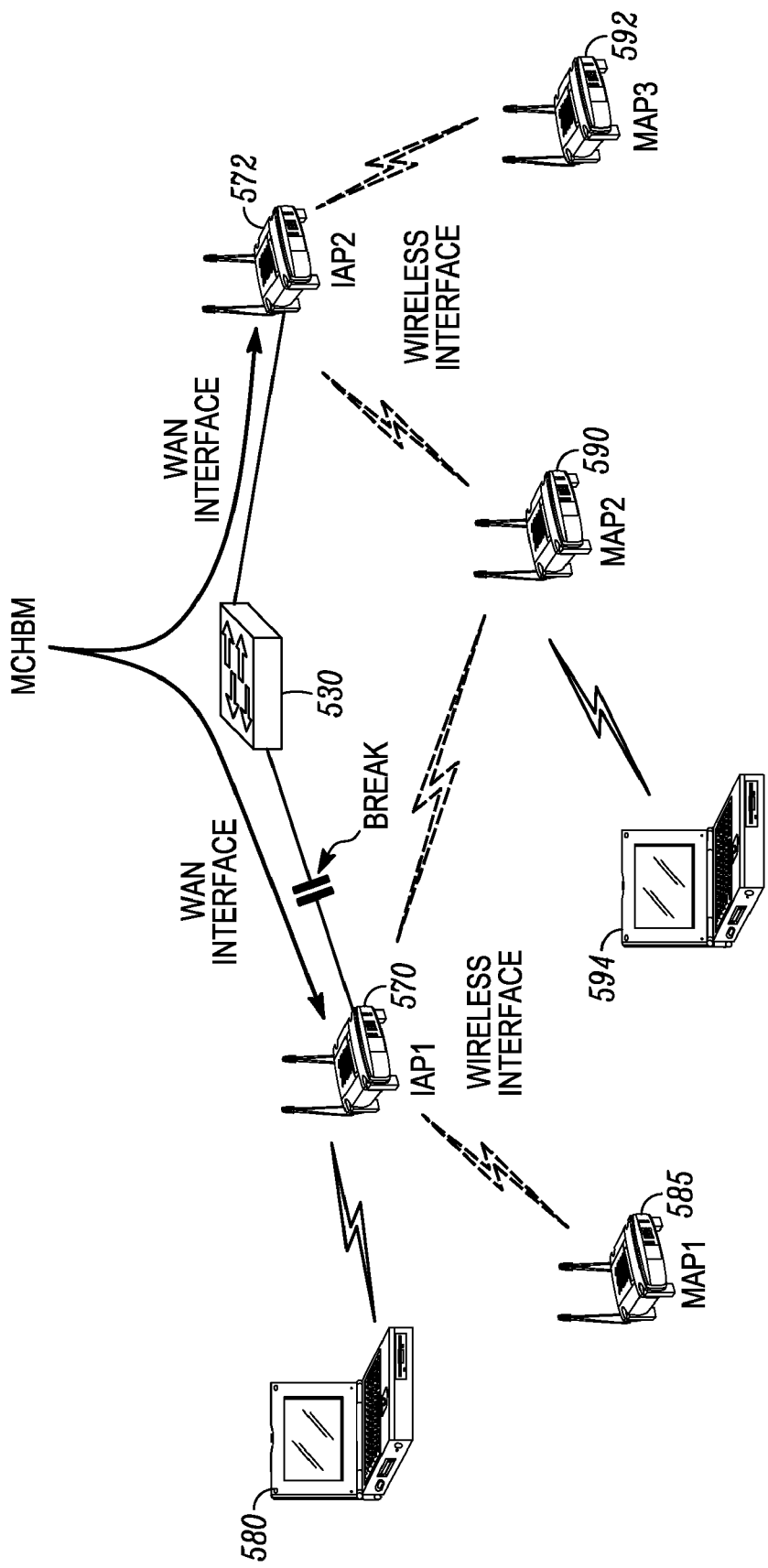
FIG. 5 is a block diagram showing an exemplary network which includes Backhaul Mesh Access Point (BMAP) operating in accordance with some embodiments of the invention.

After detecting loss of MCHBM messages, IAP1 270 begins operating as a BMAP 570, establishes a connection to the network via MAP2 590 and IAP2 572. FIG. 5 is a block diagram showing an exemplary network 500 which includes a Backhaul Mesh Access Point (BMAP) 570 operating in accordance with some embodiments of the invention. The network 500 comprises a router 530, a BMAP 570 operating in BMAP mode, and an infrastructure access point (IAP2) 572 operating in IAP mode. A host 580 and a mesh access point (MAP1) 585 are coupled to the BMAP 570. Mesh access points (MAPs) 590, 592 are coupled to the infrastructure access point (IAP2) 572, and a host 594 is coupled to the MAP 590.

During the BMAP operation, the BMAP keeps its membership in the all-IAP multicast group, and continues to monitor a port associated with the CEN 110 to detect MCHBMs from the MCHBM source 115 of the CEN 110. While operating in BMAP mode, the BMAP continues to receive general IGMP queries that are flooded throughout the network. The BMAP will respond to any IGMP queries it receives by transmitting an IGMP report for the all-IAP group on the WAN port and optionally on the wireless side. In one embodiment, this allows the all-IAP multicast group to be extended in the wireless mesh. However, the IAP will prevent the MCHBMs from being propagated into the wireless mesh. In another embodiment, even though the IGMP report for the all-IAP multicast group is optionally transmitted on the wireless interface, a mesh core/Wireless Distribution System (WDS) module in the BMAP will not trigger generation of a layer 2 wireless mesh multicast tree for the all-IAP multicast group, thus the MCHBMs are prevented from being propagated into the wireless mesh.

As described below, the BMAP 570 switches back to an IAP when it detects MCHBM on its WAN port. The BMAP 570 will not receive MCHBMs on its wireless interface. Operations of the BMAP 570 within the network 500 when changing its device type from a BMAP to an Infrastructure Access Point (IAP) device type will now be described with reference to FIGS. 6 and 7.

Switching from BMAP Mode to IAP Mode

Figure 6:
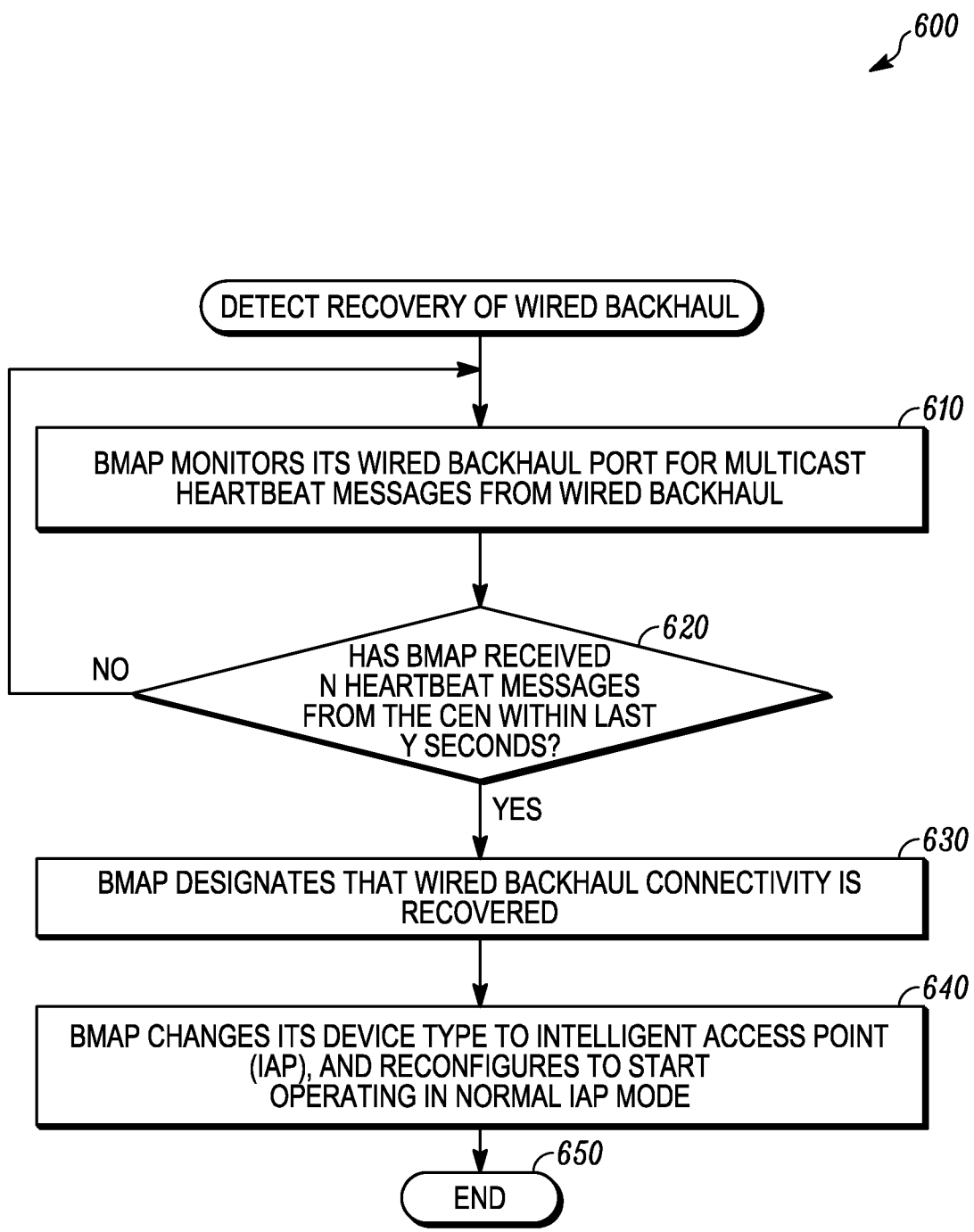
FIG. 6 is a flowchart showing an exemplary method for changing a device type of a Backhaul Mesh Access Point (BMAP) to a Infrastructure Access Point (IAP) device type when the BMAP determines that connectivity to a Customer Enterprise Network (CEN) is established in accordance with some embodiments of the invention.

FIG. 6 is a flowchart showing an exemplary method 600 for changing a device type of a Backhaul Mesh Access Point (BMAP) to an Infrastructure Access Point (IAP) device type when the BMAP determines that connectivity to a MCHBM source 115 of the CEN 110 is established in accordance with some embodiments of the invention.

The method 600 starts at step 610, where the BMAP monitors a port associated with the CEN 110 for MCHBMs originating from the backhaul (i.e., MCHBM source(s) 115 of the CEN 110), and at step 620, the BMAP determines whether it has received a number of MCHBMs from the source(s) within a time interval. For example, in one implementation of step 620, the BMAP can use its multicast processing engine to receive and process MCHBMs transmitted from the MCHBM source 115 (or sources) to determine whether it hears a number (n) of MCHBMs during a time period of y seconds. There are numerous techniques which could be used to determine whether the BMAP has received the MCHBM within this time period. One exemplary implementation of step 620 will be described below with reference to FIG. 7.

When the BMAP determines that it has not received the number of MCHBMs from the source(s) within the time interval, then after a delay, the method 600 loops back to step 610.

By contrast, when the BMAP determines that it has received the number of MCHBMs from the source(s) within the time interval, then the method 600 proceeds to step 630 where the BMAP determines that connectivity to at least one of the MCHBM source(s) 115 of the CEN 110 has been recovered. At step 640, the BMAP changes its device type to an IAP and reconfigures itself to begin operating in normal IAP mode. For instance, the BMAP will be advertising itself as an IAP.

Notably, the operation of the BMAP is different from that of a regular IAP. For example, when reconfigured as a "BMAP," the BMAP stops advertising itself as an IAP, and starts to advertise itself as an MAP. Further, it establishes a route to an IAP if it can detect one or otherwise it enters "ad hoc" mode.

Figure 7:
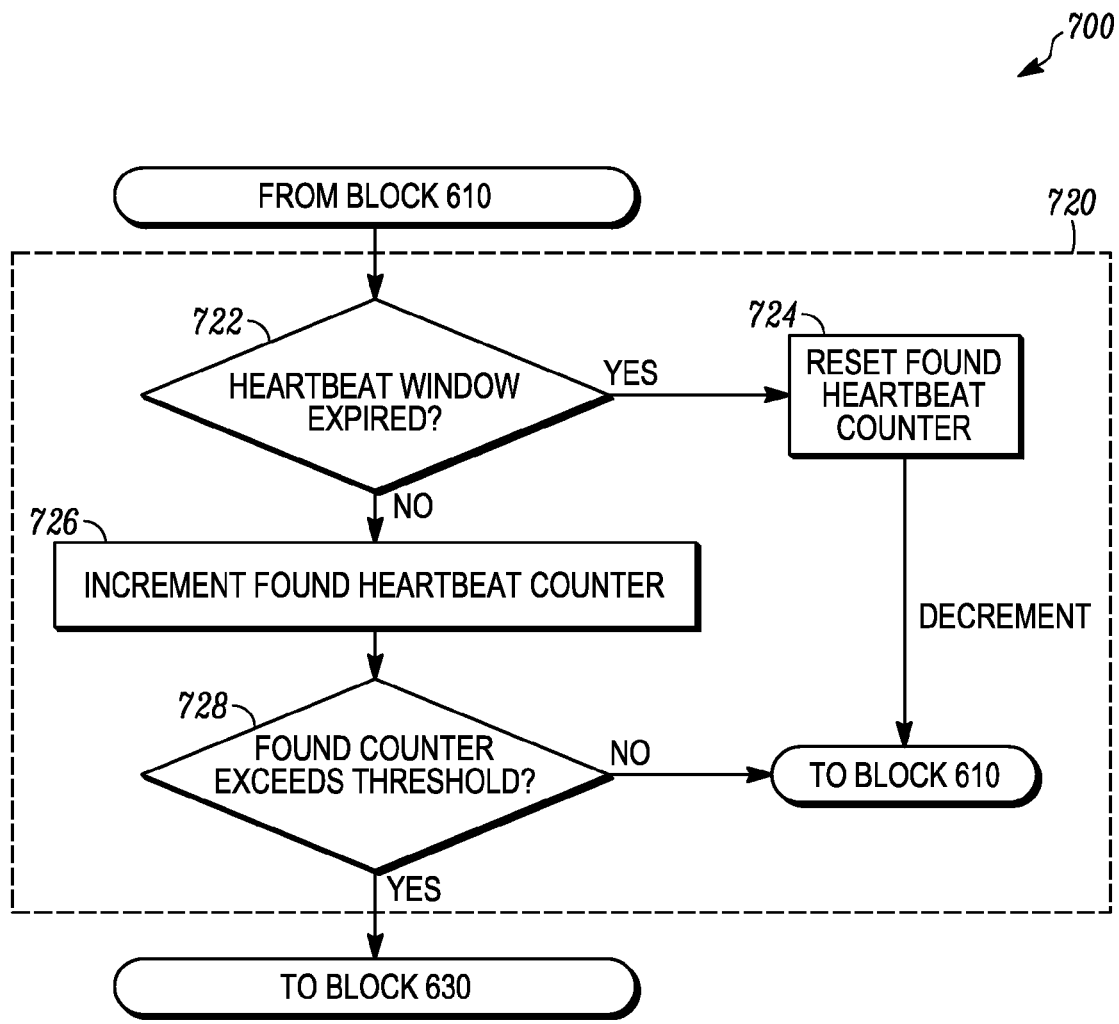
FIG. 7 is a flowchart showing an exemplary method for determining whether the Backhaul Mesh Access Point (BMAP) has received a number of heartbeat messages from a source or source(s) within a time period in accordance with some embodiments of the invention.

FIG. 7 is a flowchart showing an exemplary method 720 for determining whether the Backhaul Mesh Access Point (BMAP) has received a number of heartbeat messages from a source or source(s) within a time period in accordance with some embodiments of the invention.

Method 720 starts at step 722 where the BMAP monitors the CEN 110 for a MCHBM from the MCHBM source 115 of the CEN 110 to determine whether a "heartbeat" window has expired. For example, the BMAP can determine whether the BMAP has received a number of MCHBMs (e.g., three MCHBMs) from the MCHBM source within a heartbeat window or heartbeat duration. In one exemplary implementation, the heartbeat window can be set for a certain duration (e.g., 60 seconds).

If the BMAP determines that the "heartbeat" window has expired (e.g., the BMAP has not received the number of MCHBMs from the MCHBM source 115 within the window period), then the method 720 proceeds to step 724 where the BMAP resets its "found" heartbeat counter, and then loops back to step 610 in FIG. 6. The found heartbeat counter measures a number of MCHBMs received by the BMAP in the pre-defined time interval (e.g. within a "heartbeat" window).

If the BMAP determines that the "heartbeat" window has not expired (e.g., the BMAP has received the number of MCHBMs from the MCHBM source 115 within the window period), then the method 720 proceeds to step 726 where the BMAP increments its found heartbeat counter. The method 720 then proceeds to step 728 where the BMAP determines whether the number of found MCHBMs exceeds a threshold number of MCHBMs (e.g., four MCHBMs).

If the number of found MCHBMs is less than or equal to the threshold number of MCHBMs, then the method 720 loops back to step 610 of FIG. 6. By contrast, if the number of found MCHBMs is greater than the threshold number of MCHBMs, then the method 720 proceeds to step 630 in FIG. 6.

Notably, the operation of the IAP is different from that of a BMAP. For example, when reconfigured as an "IAP," the IAP will start advertising itself as an IAP (i.e., it is connected to the MCHBM source 115 of the CEN 110), and resume the IAP functionality as a mesh gateway node.

In the foregoing specification, specific embodiments of the present invention have been described. However, one of ordinary skill in the art appreciates that various modifications and changes can be made without departing from the scope of the present invention as set forth in the claims below.

Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for changing a device type of an Access Point (AP) comprising:

creating an all-IAP multicast group comprising a plurality of member Infrastructure Access Points (IAPs) including the Access Point;

multicasting, from at least one multicast heartbeat message (MCHBM) source via a wide area network (WAN), a multicast heartbeat message to the member IAPs of the all-IAP multicast group on a regular basis;

operating the Access Point as an Infrastructure Access Point (IAP) when receiving multicast heartbeat messages (MCHBM) on a WAN port of the Access Point;

determining, at the Access Point, whether the WAN port is connected to the WAN network based on whether the Access Point received at least one multicast heartbeat message on the WAN port; and operating the Access Point as a Backhaul Mesh Access Point (BMAP) including establishing a route to an IAP for re-establishing connectivity to the WAN network, when it is determined that the WAN port is not connected to the WAN network.

2. A method according to claim 1, further comprising:

assigning a multicast Internet Protocol (IP) address for the all-IAP multicast group.

3. A method according to claim 1, wherein determining, at the Access Point, whether the WAN port is connected to the WAN network based on whether the Access Point received at least one of the multicast heartbeat messages, further comprises:

determining, at the Access Point, whether the WAN port is connected to the WAN network based on whether the Access Point has received at least one of the multicast heartbeat messages within a time period.

4. A method according to claim 3, wherein the Access Point determines that the WAN port is connected to the WAN network when the Access Point has received at least one of the multicast heartbeat messages within the time period.

5. A method according to claim 3, wherein the Access Point determines that the WAN port is not connected to the WAN network when the Access Point has not received at least one of the multicast heartbeat messages within the time period.

6. A method according to claim 3, wherein determining, at the Access Point, whether the WAN port is connected to the WAN network based on whether the Access Point has received at least one of the multicast heartbeat messages within a time period, further comprises:

monitoring the WAN network, at the Access Point, for a multicast heartbeat message;

determining, at the Access Point, whether the Access Point has received a multicast heartbeat message from the MCHBM source within a heartbeat window duration;

resetting a missed heartbeat counter of the Access Point when the Access Point has received a multicast heartbeat message from the MCHBM source before the heartbeat window expires;

filtering the multicast heartbeat message to prevent propagation in a Mesh backhaul;

incrementing a missed heartbeat counter of the Access Point when the Access Point has not received a multicast heartbeat message from the MCHBM source within the heartbeat window duration; and determining, at the Access Point, whether the number of missed multicast heartbeat messages exceeds a threshold number of multicast heartbeat messages.

7. A method according to claim 6, wherein the Access Point determines that the WAN port is connected to the WAN network when the Access Point determines that the number of missed multicast heartbeat messages is less than or equal to the threshold number.

8. A method according to claim 6, wherein the Access Point determines that the WAN port is not connected to the WAN network when the Access Point determines that the number of missed multicast heartbeat messages is greater than the threshold number.

9. A method for changing a device type of an Access Point (AP) comprising:
   operating the Access point as a Backhaul Mesh Access Point (BMAP) including establishing a route to an Infrastructure Access Point (IAP) for connectivity to a Wide Area Network (WAN) when the Access Point is not connected to the Wide Area Network (WAN);
   monitoring, at the Access point, a WAN port for multicast heartbeat messages (MCHBMs) originating from a multicast heartbeat message (MCHBMI source;
   determining, at the Access Point, whether the Access Point has received a number of multicast heartbeat messages from the MCHBM source within a time interval;
   determining, at the Access Point, that the WAN port of the Access Point has established connectivity to the WAN network when the Access Point determines that the number of multicast heartbeat messages have been received within the time interval; and
   operating the Access Point as an Infrastructure Access Point (IAP) when it is determined that the WAN port of the Access Point has established connectivity to the WAN network.

10. A method according to claim 9, further comprising:
    changing the device type of the Access Point to an IAP device type when the Access Point determines that the WAN port of the Access Point has established connectivity to the WAN network.

11. A method according to claim 10, further comprising:
    reconfiguring the Access Point to operate in an IAP mode.

12. A method according to claim 9, wherein determining, at the Access Point, whether the Access Point has received a number of multicast heartbeat messages from a MCHBM source within a time interval, further comprises:

determining, at the Access Point, whether the Access Point has received a number of multicast heartbeat messages from the MCHBM source within a heartbeat duration;
   incrementing a found heartbeat counter that measures a number of multicast heartbeat messages received by the Access point, when the Access Point determines that the Access Point has received a number of multicast heartbeat messages from the MCHBM source within the heartbeat duration;
   determining, at the Access Point, whether the number of received multicast heartbeat messages exceeds a threshold number of multicast heartbeat messages; and
   determining that the WAN port of the Access Point has established connectivity to the WAN network when the number of received multicast heartbeat messages exceeds the threshold number of multicast heartbeat messages.

13. A method according to claim 12, further comprising:
    resetting the found heartbeat counter that measures a number of multicast heartbeat messages received by the Access Point, when the Access Point determines that the Access Point has not received the number of multicast heartbeat messages from the MCHBM source within the heartbeat window duration.

14. A method according to claim 12, further comprising:
    changing the device type of the Access Point to an IAP device type when the Access Point determines that the WAN port of the Access Point has established connectivity to the WAN network; and
    reconfiguring the Access Point to operate in an IAP mode.

15. A method according to claim 14, further comprising:
    ignoring all-IAP multicast group membership reports to prevent a multicast tree from forming to ensure that any multicast heartbeat messages come from a WAN port of the Access Point.

* * * * *

UNITED STATES PATENT AND TRADEMARK OFFICE
CERTIFICATE OF CORRECTION

PATENT NO. : 7,742,442 B2  
APPLICATION NO. : 11/622230  
DATED : June 22, 2010  
INVENTOR(S) : Lundsgaard et al.

Page 1 of 1

It is certified that error appears in the above-identified patent and that said Letters Patent is hereby corrected as shown below:

On the Face Page, in the Figure, insert -- 500 --, above the figure.

In Fig. 2, Sheet 2 of 7, insert -- 200 --, above the figure.

In Fig. 5, Sheet 5 of 7, insert -- 500 --, above the figure.

In Column 11, Line 13, in Claim 9, delete "(MCHBMI" and insert -- (MCHBM) --, therefor.

Signed and Sealed this
Twenty-eighth Day of August, 2012

David J. Kappos
*Director of the United States Patent and Trademark Office*